Dec. 16, 1969     L. E. WOOD     3,484,817
SAFETY PRESSURE RELIEF DEVICE

Filed Nov. 7, 1967     3 Sheets-Sheet 1

INVENTOR.
LOREN E. WOOD

INVENTOR.
LOREN E. WOOD

United States Patent Office 3,484,817
Patented Dec. 16, 1969

3,484,817
SAFETY PRESSURE RELIEF DEVICE
Loren E. Wood, Raytown, Mo., assignor to Black, Swalls & Bryson, Inc., Kansas City, Mo., a corporation of Delaware
Filed Nov. 7, 1967, Ser. No. 681,228
Int. Cl. B65d 41/20
U.S. Cl. 220—89                                12 Claims

ABSTRACT OF THE DISCLOSURE

A safety pressure relief device including a concave-convex rupture disc with lines of weakness on its concave or convex side and subjected to pressure on its convex side capable of operating at 90% or more of its rated rupture pressure.

BACKGROUND OF THE INVENTION

A safety pressure relief device of the rupture disc type capable of operating at 90% or more of its rated rupture pressure has been the objective of the industry for many years. One such device recently developed is disclosed in my Patent No. 3,294,277. This device utilizes a reverse buckling concave-convex rupture disc, as does my present invention, but also includes a set of knife blades to open the disc and prevent fragmentation from occurring.

It has been found that a reverse buckling rupture disc, i.e., a concave-convex rupture disc subjected to pressure on its convex side, has the advantage over conventional rupture discs in that fatigue and creep problems, which have the effect to shorten the operating life of a rupture disc, are minimized. Since the failure mode of a reverse buckling disc depends mainly upon the elastic instability of the disc, which is a relatively stable property based upon the elastic modulus of the disc material, properly designed reverse buckling discs can be operated at 90% or more of their rated rupture pressure and have a service life of 10 to 50 times that of conventional discs.

Reverse buckling disc assemblies which utilize knife blades to achieve full opening without fragmentation are well suited for relatively low pressure applications. However, for high pressure applications, heavy knife blades must be used to open the thicker rupture discs required, and as a result, these assemblies are very clostly. Also, special rupture disc and knife blade supporting members are required.

The present invention provides means for bringing about full opening of a reverse buckling rupture disc without fragmentation obviating the necessity for knife blades and related supporting members.

SUMMARY OF THE INVENTION

The present invention is directed to the provision of scores which create lines of weakness on either the concave side or convex side of a reverse buckling rupture disc. It has been discovered that through proper design a scored reverse buckling disc will, upon reaching a predetermined pressure, reverse itself and tear open along said scores without fragmentation of the disc. As a result knife blades or other means for causing the disc to open upon reversal are unnecessary.

It is, therefore, an object of the present invention to provide a safety pressure relief device which includes a concave-convex rupture disc subjected to pressure on its convex side.

A further object of the present invention is to provide a safety pressure relief device having a scored reverse buckling rupture disc and seating configuration so that operation at 90% or more of the rated rupture pressure may be achieved.

Yet a further object of the present invention is the provision of a reverse buckling concave-convex rupture disc including scores thereon so that upon reaching a predetermined pressure on its convex side it will reverse itself, tear along the scores, and achieve full opening without fragmentation.

Still a further object of the present invention is to provide a safety pressure relief device without knife blades having a concave-convex reverse buckling rupture disc with scores thereon such that upon reaching rated rupture pressure complete opening of the rupture disc is achieved.

Other and further objects, features and advantages will be apparent from the following description of presently preferred embodiments of the invention, given for the purpose of disclosure, and taken in conjunction with the accompanying drawings.

DESCRIPTION OF THE DRAWINGS

In the drawings forming a part of the disclosure herein, like character references designate like parts throughout the several views wherein.

DESCRIPTION OF THE PREFERRED EMBODIMENT

Figure 1:
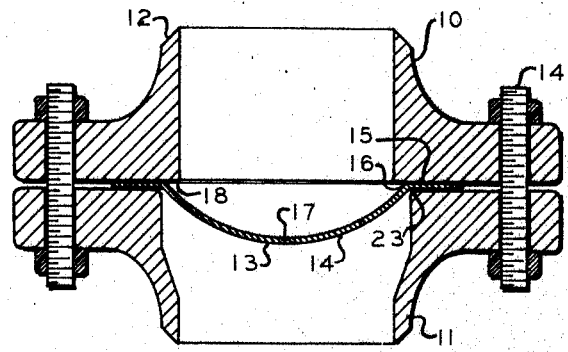
FIGURE 1 is an elevational view, in cross section, of a safety pressure relief device of the present invention.

Referring now to the drawings and particularly to FIGURE 1, reference numeral 10 generally designates the safety pressure relief device of the present invention. The device 10 generally includes inlet support member 11, outlet supporting member 12, and rupture disc 13. Supporting members 11 and 12 are similar to pipe flanges in that they have necks suitable for welding to pipe of the same diameter, or they may contain threads for receiving threaded pipe, or they may be constructed so that they can be inserted between two pipe flanges. In operation, inlet member 11 is connected directly to a pressure vessel nozzle, or to a pipe which is in turn connected to a pressure system so that fluid pressure within the vessel or system is exerted against rupture disc 13. Outlet member 12 may be left open to the atmosphere or connected by a pipe to a second vessel or system at a lower pressure level.

Each of supporting members 11 and 12 may contain a plurality of openings so that they may be securely fastened together, such as by studs 14. Studs 14 also align and secure rupture disc 13 between supporting members 11 and 12 thereby preventing fluid pressure exerted within inlet member 11 and against rupture disc 13 from escaping so long as rupture disc 13 is intact.

The disc 13 can be of various shapes and preferably consists of a spherical sector portion 14 with its convex side being subjected to fluid pressure so that the disc 13 is placed in a state of compression. The disc 13 also includes an annular flange portion 15 connected to spherical portion 14 by a transition connection 16. The annular flange portion 15 is secured and supported between supporting members 11 and 12. Disc 13 is formed of sheet material that is self-supporting under normal operating pressures, but will reverse itself and rupture when fluid pressures exerted on its convex side exceed those for which it was designed.

Figure 2:
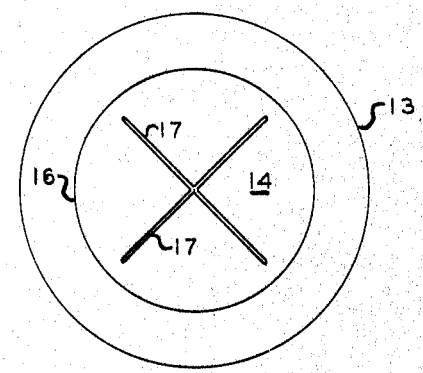
FIGURE 2 is a top plan view of the rupture disc shown in FIGURE 1.

Referring now to FIGURE 2, a top plan view of rupture disc 13 is illustrated. Disc 13 includes scores 17 creating lines of weakness preferably intersecting at the center of spherical portion 14 and extending to near transition connection 16. In this form of the invention two scores 17 are preferably used to divide spherical portion 14 into quadrants.

Figure 3:
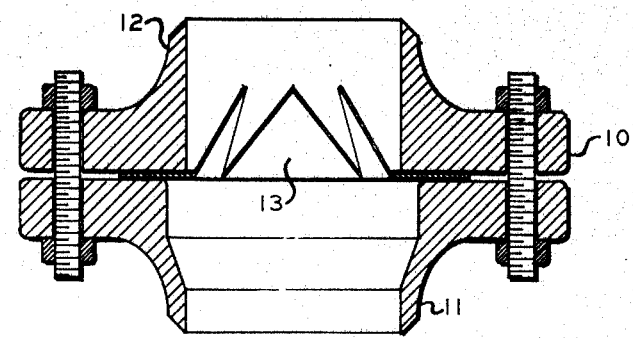
FIGURE 3 is an elevational view, in cross section, of the apparatus of FIGURE 1, illustrating the rupture disc after rupture has occurred.

When the fluid pressure exerted within inlet member 11 and against the convex side of rupture disc 13 reaches a level exceeding design, the elastic stability of rupture disc 13 becomes unstable causing it to reverse buckle. Upon reversal, rupture disc 13 will tear along scores 17 due to the tensile force exerted on it as a result of the reversing process and open in the manner illustrated in FIGURE 3. Due to the fact that tearing of disc 13 occurs along scores 17 no fragmentation of disc 13 occurs.

Referring again to FIGURES 1 and 3, it should be noted that outlet member 12 is provided with a shoulder 18 the inner edge of which is positioned inwardly as compared to the inner edge 23 of inlet member 11 and as compared to the inner edge of annular flange 15 of disc 13. This shoulder provides support for the transition connection 16 during the operation of safety pressure relief device 10 and prevents disc 13 from prematurely failing due to stress or fatigue. This shoulder is usually necessary when the form of the present invention illustrated in FIGURE 1 is utilized. However, there are conditions under which a shoulder is not required and a device similar to that shown in FIGURE 1 may be utilized which does not include a shoulder. Since this shoulder is adequately described in my aforementioned U.S. Letters Patent No. 3,294,277, no further description here is deemed necessary.

Figure 4:
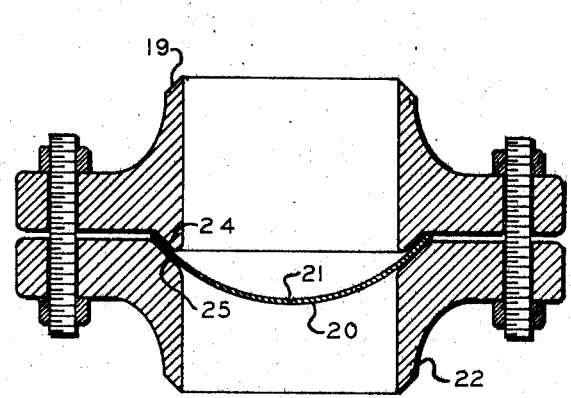
FIGURE 4 is an elevational view, in cross section, of a modified form of the present invention.
Figure 5:
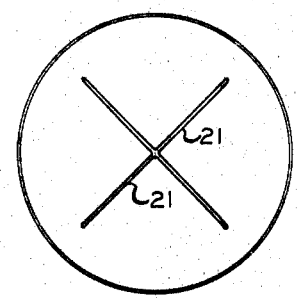
FIGURE 5 is a top plan view of the rupture disc shown in FIGURE 4.

Referring now to FIGURES 4 and 5, a modified form of the present invention is shown. This form includes an inlet supporting member 22, an outlet supporting member 19, and a reverse buckling rupture disc 20. Disc 20 contains scores 21 on either its concave or convex sides which preferably intersect at the center of disc 20 and extend to near its periphery, thereby dividing it into quadrants. Disc 20 is in the general shape of a spherical sector and does not include an annular flat flange portion or transition connection. While a disc of the shape illustrated in FIGURES 1, 2 and 3 has the advantage that it will be located in the proper position by the co-action of the inner edge 23 of inlet member 11 with transition connection 16 of the disc, it has the disadvantage that it has a tendency to fail by fatigue and creep at the transition connection instead of by elastic instability. The form of the invention shown in FIGURES 4 and 5 eliminates the transition connection and annular flat flanges and thereby reduces to a minimum the possibility of premature failure by fatigue and creep. Disc 20 is supported and secured between seating surfaces 24 and 25 provided on supporting members 19 and 22 respectively. It should be noted, however, that care must be taken in positioning disc 20 during assembly of the device illustrated in FIGURES 4 and 5 to insure that misalignment of disc 20 does not occur.

Figure 6:
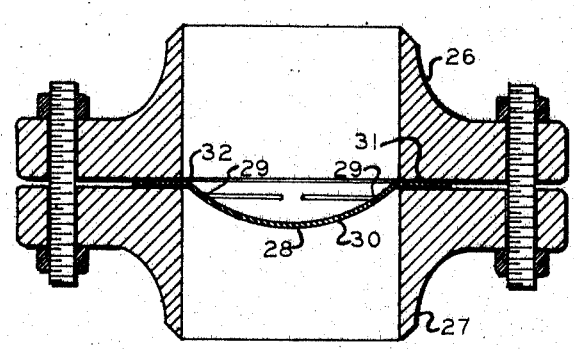
FIGURE 6 is an elevational view, in cross section, of another modified form of the present invention.
Figure 7:
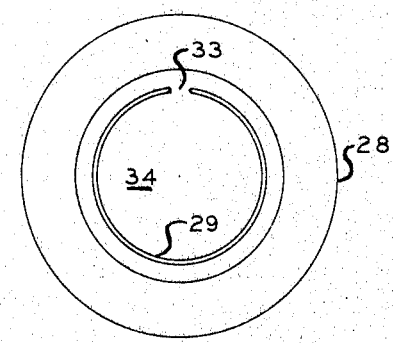
FIGURE 7 is a top plan view of the rupture disc shown in FIGURE 6.
Figure 8:
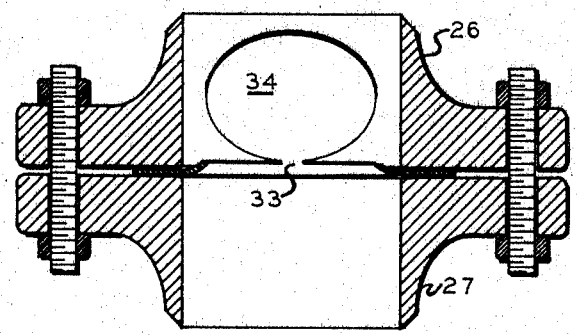
FIGURE 8 is an elevational view, in cross section, of the apparatus of FIGURE 6, illustrating the apparatus after rupture has occurred.

Referring now to FIGURES 6, 7 and 8, still another form of the present invention is illustrated. This form includes an inlet supporting member 26, an outlet supporting member 27, and a reverse buckling rupture disc 28. Disc 28 preferably consists of a spherical sector portion 30 and an annular flange portion 31, connected to spherical sector portion 30 by transition connection 32. Spherical sector portion 30 may contain one score 29 as illustrated in FIGURE 7, or a plurality of smaller scores, defining a circular area 34 within the spherical sector portion 30. Score 29 may be on either the concave or convex side of disc 28 and begins at a point near transition connection 32. It terminates short of a complete circle leaving solid portion 33. FIGURE 8 illustrates rupture disc 28 after rupture has occurred. As shown, upon reaching rated rupture pressure disc 28 will reverse itself and then tear along score 29 so that circular area 34 lifts up in a similar fashion to a tin can top. Disc 28 does not tear at solid portion 33 thereby preventing circular area 34 from disattaching itself completely.

Thus, because of its shape and seating configuration, the reverse buckling disc of the present invention has been found to successfully operate at 90% of its rated pressure without premature failure through fatigue and creep. Also, because of the scores on the disc, the present invention has been found to achieve full opening without fragmentation of the disc occurring.

The present invention, therefore, is well adapted to carry out the objects and attain the ends and advantages mentioned as well as those inherent therein. While presently preferred embodiments of the invention are given for the purpose of disclosure, numerous changes in the details of construction and arrangement of parts can be made which will readily suggest themselves to those skilled in the art.

What is claimed is:

1. In a safety pressure relief device having a concave-convex reverse buckling disc supported between inlet and outlet supporting members, with the convey surface of said disc facing said inlet supporting member, the improvement comprising:

said disc having an annular flat flange portion connected to a concave-convex portion by a transition connection, said concave-convex portion being in a state of compression when pressure is exerted on the convex surface thereof and having scores on a surface thereof whereby lines of weakness are created therein, said scores being of a character such that said concave-convex portion of said disc reverses itself at a lower pressure than the pressure required to cause said concave-convex portion to tear along said lines of weakness prior to reversal so that when said pressure reaches the rated rupture pressure of said disc, said concave-convex portion of said disc reverses itself and then tears along said lines of weakness; and each of said supporting members having an annular flat portions to coact and support said annular flat flange portion of said disc.

2. The apparatus of claim 1 wherein said scores intersect at the center of said concave-convex portion and extend to near said transition connection.

3. The apparatus of claim 2 wherein said scores divide said concave-convex portion of said disc into quadrants.

4. In a safety pressure relief device having a concave-convex reverse buckling disc supported between inlet and outlet supporting members with the convex surface of said disc facing said inlet supporting member, the improvement comprising:

said disc having an annular flat flange portion connected to a concave-convex portion by a transition connection, said concave-convex portion being in a state of compression when pressure is exerted on the convex surface thereof and having scores on a surface thereof whereby lines of weakness are created therein, said scores being of a character such that said concave-convex portion of said disc reverses itself at a lower pressure than the pressure required to cause said concave-convex portion to tear along said lines of weakness prior to reversal so that when said pressure reaches the rated rupture pressure of said disc, said concave-convex portion of said disc reverses itself and then tears along said lines of weakness; and each of said supporting members having annular flat portions to coact and support said annular flat flange, the annular flat portion of said outlet supporting member extending inwardly further than the annular flat portion of said inlet supporting member whereby a back-up shoulder for said transition connection is provided.

5. The apparatus of claim 4 wherein said scores intersect at the center of said concave-convex portion and extend to near said transition connection.

6. The apparatus of claim 5 wherein said scores divide said concave-convex portion of said disc into quadrants.

7. In a safety pressure relief device having a concave-convex reverse buckling disc supported between inlet and outlet supporting members with the convex surface of said disc adjacent to said inlet supporting member, the improvement comprising:

said concave-convex disc being in a state of compression when pressure is exerted on the convex surface thereof and having scores on a surface thereof whereby lines of weakness are created therein, said scores being of a character such that said concave-convex portion of said disc reverses itself at a lower pressure than the pressure required to cause said concave-convex portion to tear along said lines of weakness prior to reversal so that when said pressure reaches the rated rupture pressure of said disc, said disc reverses itself and then tears along said lines of weakness; and each of said supporting members having annulus portions to coact and rigidly support said disc.

8. The apparatus of claim 7 wherein said scores intersect at the center of said disc and extend to near the periphery of said disc.

9. The apparatus of claim 8 wherein said scores define quadrants in said disc.

10. In a safety pressure relief device having a concave-convex reverse buckling disc supported between inlet and outlet supporting members, with the convex surface of said disc facing said inlet supporting member, the improvement comprising:

said disc having an annular flat flange portion connected to a concave-convex portion by a transition connection, said concave-convex portion being in a state of compression when pressure is exerted on the convex surface thereof and having a score defining a circular area on a surface thereof whereby a line of weakness is created therein, said scores being of a character such that said concave-convex portion of said disc reverses itself at a lower pressure than the pressure required to cause said concave-convex portion to tear along said lines of weakness prior to reversal so that when said pressure reaches the rated rupture pressure of said disc, said concave-convex portion of said disc reverses itself and then tears along said line of weakness; and each of said supporting members having annular flat flange portions to coact and support said annular flat flange portion of said disc.

11. In a safety pressure relief device having a concave-convex reverse buckling disc supported between inlet and outlet supporting members, with the convex surface of said disc facing said inlet supporting member, the improvement comprising:

said disc having an annular flat flange portion connected to a concave-convex portion by a transition connection, said concave-convex portion being in a state of compression when pressure is exerted on the convex surface thereof and having a score defining a circular area on a surface thereof whereby a line of weakness is created therein, said scores being of a character such that said concave-convex portion of said disc reverses itself at a lower pressure than the pressure required to cause said concave-convex portion to tear along said lines of weakness prior to reversal so that when said pressure reaches the rated rupture pressure of said disc, said concave-convex portion of said disc reverses itself and tears along said line of weakness; and then each of said supporting members having annular flat portions to coact and support said annular flat flange, the annular flat portion of said outlet supporting member extending inwardly further than the annular flat portion of said inlet supporting member whereby a back-up shoulder for said transition connection is provided.

12. In a safety pressure relief device having a concave-convex reverse buckling disc supported between inlet and outlet supporting members with the convex surface of said disc adjacent to said inlet supporting member, the improvement comprising:

said concave-convex disc being in compression when pressure is exerted on the convex surface thereof and having a score defining a circular area on a surface thereof whereby a line of weakness is created therein, said scores being of a character such that said concave portion of said disc reverses itself at a lower pressure than the pressure required to cause said concave-convex portion to tear along said lines of weakness prior to reversal so that when said pressure reaches the rated rupture pressure of said disc, said disc reverses itself and then tears along said line of weakness; and each of said supporting members having annulus portions to coact and rigidly support said disc.

References Cited

UNITED STATES PATENTS

| | | |
|---|---|---|
| 2,225,220 | 12/1940 | Huff. |
| 3,257,026 | 6/1966 | Taylor. |
| 2,553,267 | 5/1951 | Nedoh. |
| 2,580,365 | 12/1951 | Simmonds. |
| 3,005,573 | 10/1961 | Dawson et al. |
| 3,294,277 | 12/1966 | Wood. |
| 3,327,894 | 6/1967 | Ferris. |

RAPHAEL H. SCHWARTZ, Primary Examiner

UNITED STATES PATENT OFFICE
CERTIFICATE OF CORRECTION

Patent No. 3,484,817                        December 16, 1969

Loren E. Wood

It is certified that error appears in the above identified patent and that said Letters Patent are hereby corrected as shown below:

In the heading to the printed specification, lines 3 and 4, "Black, Swalls & Bryson, Inc.," should read -- Black, Sivalls & Bryson, Inc., --.

Signed and sealed this 16th day of June 1970.

(SEAL)
Attest:

Edward M. Fletcher, Jr.
Attesting Officer

WILLIAM E. SCHUYLER, JR.
                                                Commissioner of Patents